United States Patent [19]
Tosato et al.

[11] 4,355,785
[45] Oct. 26, 1982

[54] ELECTRICALLY DRIVEN SHEAVE

[75] Inventors: Lawrence P. Tosato, Millburn; Clyde M. Mullis, Glen Rock, both of N.J.

[73] Assignee: Westinghouse Electric Corp., Pittsburgh, Pa.

[21] Appl. No.: 237,017

[22] Filed: Feb. 23, 1981

[51] Int. Cl.³ .................. B66D 1/12; B66D 3/20; B66D 5/12
[52] U.S. Cl. .................... 254/362; 187/20; 254/378
[58] Field of Search ........... 254/362, 392, 378, 379, 254/380, 266, 371; 187/11, 20, 27; 310/258

[56] References Cited
U.S. PATENT DOCUMENTS

| | | | |
|---|---|---|---|
| 1,869,152 | 7/1932 | Jones | 254/362 |
| 2,667,331 | 1/1954 | Robins et al. | 254/380 |
| 3,120,880 | 2/1964 | Jaseph | 187/20 |
| 4,084,793 | 4/1978 | Gardiner | 254/362 |
| 4,108,280 | 8/1978 | Eastcott et al. | 187/20 |

*Primary Examiner*—Billy S. Taylor
*Attorney, Agent, or Firm*—D. R. Lackey

[57] ABSTRACT

An electrical drive having a sheave, motor drive shaft, and first and second bearings in coaxial alignment. The first bearing rotatably mounts the sheave on an adaptor member which additionally functions to complete the enclosure of a drive motor module removably attached thereto. The second bearing, which is part of the drive motor module, supports one end of the motor drive shaft, while the other end extends through an opening in the adaptor module into driving engagement with, and support by the sheave.

13 Claims, 2 Drawing Figures

ELECTRICALLY DRIVEN SHEAVE

BACKGROUND OF THE INVENTION

1. Field of the Invention

The invention relates in general to electrical drive arrangements, and more specifically to electrical drives having a sheave suitable for supporting and driving a suspended load.

2. Description of the Prior Art

Certain applications, such as traction elevator systems, require an electrical drive for driving a sheave. A plurality of wire ropes are reeved over the sheave, with the opposite ends being connected to an elevator car and counterweight. When the contract speed of the elevator system exceeds about 500 fpm, a speed reduction gear is not required and it is conventional in the prior art to provide the elevator drive machine for such applications as a standardized package. In this package, the drive sheave, armature, commutator, and brake drum are all assembled to one shaft within the frame of a direct current motor. The motor shaft and bearings are sized to carry the suspended load, i.e., the weight of the elevator car and counterweight. While this arrangement is functionally adequate, the motor shaft diameter is necessarily quite large, because it must withstand the large bending moments created by the suspended load, and this large shaft substantially increases the size and cost of the motor because of the special large armature punchings and commutator required.

SUMMARY OF THE INVENTION

Briefly, the present invention is a new and improved electrical drive arrangement which includes a sheave module having a traction or drive sheave mounted for rotation on an adaptor member, with the adaptor member being suitably supported from a mounting base. The adaptor member additionally functions as a first housing portion of a drive motor. A first bearing assembly rotatably supports the sheave, with this bearing assembly being located on the center line of the load applied to the sheave working surface, such that the first bearing and adaptor member provide the entire support for a load which may be suspended from the sheave. A drive motor module, which provides the torque for driving the sheave, includes a rotor, stator, and a second housing portion. The rotor includes a drive shaft, one end of which is supported by a second bearing assembly mounted in the second housing portion. The other end of the drive shaft extends through an opening in the adaptor member into driving engagement with the sheave, when the first and second housing portions are coupled. Different motor ratings may be coupled with the sheave module, depending upon torque requirements. Since the drive motor shaft is not subject to a bending moment from the suspended load, its diameter and thus the physical size and cost of the motor may be substantially reduced.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF PREFERRED EMBODIMENTS

Figure 1:
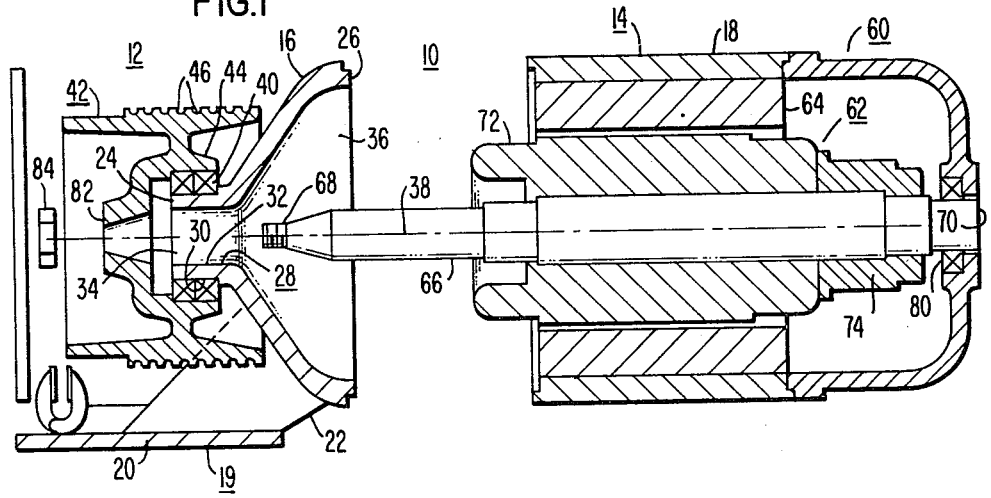
FIG. 1 is an exploded cross-sectional view of an electrical drive constructed according to the teachings of the invention.
Figure 2:
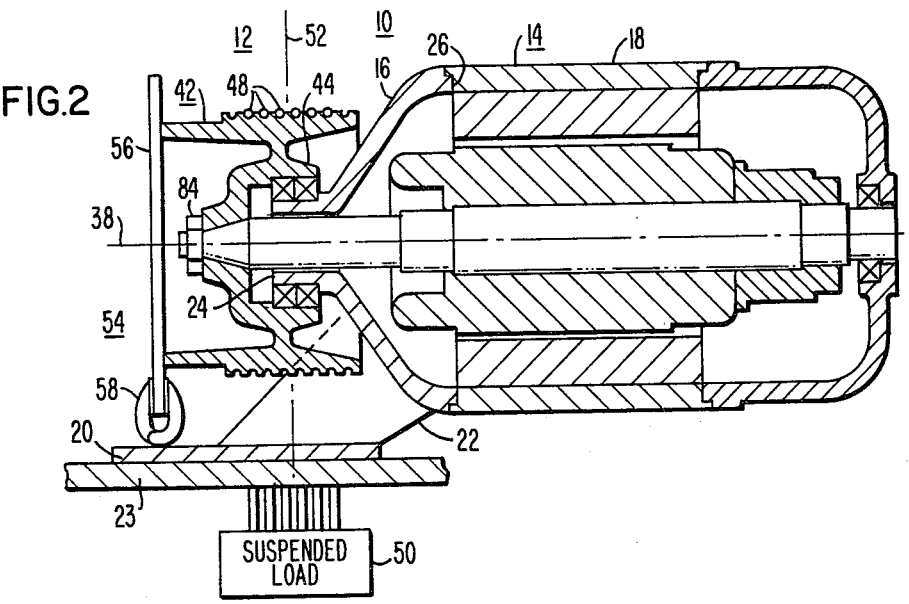
FIG. 2 is a cross-sectional view which illustrates the electrical drive of FIG. 1 assembled and adapted to drive a suspended load, such as an elevator car and its counterweight.

Referring now to the drawings, FIG. 1 is an exploded view, in section, of an electrical drive 10 constructed according to the teachings of the invention. FIG. 2 illustrates the drive 10 shown in FIG. 1 after assembly. Drive 10 includes a sheave module 12 and a drive motor module 14. Sheave module 12 and motor module 14 include first and second housing portions 16 and 18, respectively, which, when assembled, cooperatively define an enclosure for the drive motor.

The first housing portion 16 is an adaptor member which is supported by a pedestal 19, or other suitable mounting frame, which includes a base 20 and support arms 22. The support arms 22 extend from base 20 to the adaptor member 16. Base 20 may be secured to a bed plate 23 shown in FIG. 2. The first housing portion 16, as hereinbefore stated, is a special adaptor member constructed to accept one or more motor frame sizes. It has first and second ends 24 and 26, respectively, including a right cylindrical, tubular portion 28 adjacent to its first end 24. Tubular portion 28 includes outer and inner surfaces 30 and 32, respectively, with the inner surface 32 defining an opening 34 having a predetermined diameter. The side wall of the first housing or adaptor member 16 then flares sharply outward to define an opening at its second end 26 which has a substantially larger diameter than the diameter of opening 34 at its first end 24. End 26 may be configured as illustrated if it is required to mate with a specific frame size. If it will be required to cooperate with more than one frame size, end 26 may more appropriately terminate in a flanged portion, with the direction of the flange being perpendicular to an axis 38 which extends coaxially through openings 34 and 36.

A first bearing assembly 40 is mounted about the outer surface 30 of tubular portion 28, with the first bearing assembly 40 being a bearing selected for its load supporting characteristics, such as tapered roller bearings. A traction drive sheave 42 is rotatably mounted on the first bearing assembly 40 via an inner hub portion 44. The outer periphery of sheave 42 includes a plurality of grooves 46 for receiving a plurality of wire ropes 48 which are reeved over the sheave 42. The ends of the wire ropes 48 are attached to an elevator car on one side of sheave 42, and to a counterweight on the other side, with these two elements being referred to collectively as a suspended load 50. The sheave module 12 supports the complete weight of the suspended load 50. It is important to note that the center line 52 of the working surface of sheave 42 coincides with the center line of the first bearing assembly 40. Thus, the weight of the suspended load is uniformly applied to the first bearing assembly 40 without any twisting or bending moments which might dictate the use of self-aligning bearings, instead of the preferred tapered roller bearings.

As illustrated, a disc brake arrangement 54 may be utilized, which includes a disc 56 fastened to one axial end of sheave 42, and disc brake shoes 58 mounted on base 20. Alternatively, a drum brake arrangement may be used, with a brake drum being disposed axially adjacent to sheave 42 and radially keyed thereto, or otherwise suitably attached, as desired.

The drive module 14 is a direct current motor having a three-quarter motor frame, including a stator and rotor portion 60 and 62, respectively. Stator 60 includes the second housing portion 18 hereinbefore referred to. Stator 60 additionally includes field windings disposed about magnetic cores, with these assemblies being shown generally at 64, and a brush assembly (not shown).

The rotor 62 includes a drive or output shaft 66 having first and second ends 68 and 70, respectively. An armature 72 having a commutator 74, which cooperates with the brush assembly, is disposed on shaft 66.

A second bearing assembly 80 is supported by the second housing portion 18 at what may be referred to as the second axial end of the resulting composite housing assembly, with the second end 70 of shaft 66 being rotatably supported by this bearing. Bearing assembly 80 is a self-aligning bearing, which allows for the slight shaft misalignment which will occur until the drive module 18 is assembled with the sheave module 16.

Upon assembly of the motor module 18 with the sheave module 16, the first and second housing portions 16 and 18 are suitably bolted together, causing the first end 68 of shaft 66 to extend outwardly through opening 34, with opening 34 being slightly larger than the outside diameter of shaft 66 at this location. The first end 68 of shaft 66 extends into driving engagement with sheave 42. As illustrated, the hub portion 44 of sheave 42 may be modified to include a portion 82 sized to receive end 68. A key may be inserted into aligned slots or openings, in order to positively key the shaft to the sheave, and a nut 84 may be engaged with threads which are disposed adjacent to end 68. If a drum brake is utilized instead of a disc brake, the first end 68 of shaft 66 may be coupled to the brake drum, instead of to the sheave, which is in turn coupled to the drive sheave. In either arrangement, the connection between the shaft and sheave is direct in the sense that there is no speed reduction gear, and in either arrangement, end 68 of shaft 66 is indirectly supported and mounted for rotational movement by the first bearing assembly 40 via the drive sheave 42.

Shaft 66, whose rotational axis is coaxial with the rotational axis of sheave 42 and with the axial centers of the first and second bearing assemblies 40 and 80, respectively, is not subjected to any bending moment due to the suspended load 50. Thus, the shaft and associated motor may be selected for the torque requirement of the load. Since the diameter of the output shaft 66 for providing the torque requirement is substantially less than that of the prior art drive machines which are sized to support the suspended load, the armature laminations and commutator may have a smaller outside diameter, resulting in a smaller armature and thus a smaller stator, substantially reducing the manufacturing cost of the drive motor module.

In addition to reducing the motor cost, the disclosed arrangement facilitates a modular approach in which the motor brake, sheave and motor frame may be independently selected and assembled to more closely match the requirements of each application. Also, the drive motor module may be removed from the sheave module for servicing, or for replacement, without disturbing the suspended load, substantially reducing the service cost as well as the out-of-service time.

I claim as my invention:

1. An electrical drive, comprising:
   an adaptor member having first and second ends, including a cylindrical, tubular portion adjacent to its first end having an outer surface, and an inner surface, said inner surface defining an opening which extends between its end which starts at a predetermined diameter and then flares outwardly to a second diameter at its second end,
   means supporting said adaptor member,
   a first bearing assembly disposed about the outer surface of the cylindrical, tubular portion of said adaptor member,
   a sheave rotatably supported by said first bearing assembly, with the center line of the sheave working surface intersecting said first bearing,
   and a drive motor having a housing removably coupled to said adaptor member, with said adaptor member and housing cooperatively defining an enclosure for said drive motor,
   said drive motor including a drive shaft having first and second ends, with said first end extending through the opening at the first end of said adaptor member into driving engagement with, and support by, said sheave,
   and second bearing means in said housing for rotatably supporting the second end of said drive shaft.

2. The electrical drive of claim 1 wherein the center line of the working surface of the sheave and the center line of the first bearing assembly lie in the same plane.

3. The electrical drive of claim 1 wherein the sheave is grooved for receiving a plurality of wire ropes, the ends of which are connected to suspended loads.

4. The electrical drive of claim 1 wherein the first and second bearing assemblies each have a center concentric with the rotational axis of the drive shaft.

5. The electrical drive of claim 1 wherein the driving engagement between the drive shaft and sheave is a direct driving engagement, devoid of speed changer means.

6. The electrical drive of claim 1 wherein the motor is a direct current motor, with the rotor being the armature and the stator including the field windings.

7. The electrical drive of claim 1 including a disc brake arrangement having a rotatable disc and positionally fixed disc brake pads, with said disc being mounted for rotation with the sheave such that its periphery is engageable by said disc brake pads.

8. An electrical drive, comprising:
   a drive motor having a stator, and a rotor within said stator,
   said stator including a housing having first and second ends,
   said housing including a tubular portion adjacent to its first end which has an interior surface defining a first opening, and an exterior surface,
   first and second bearing means supported by said stator, with the first bearing means being mounted on the exterior surface of said tubular housing portion,
   and a sheave, said sheave being mounted for rotation on said first bearing means,
   said rotor including a drive shaft having a first end which extends through said first opening into driving engagement with, and support by, said sheave, and a second end support by said second bearing means,
   whereby a load applied to said sheave is supported by said first bearing means and said housing, enabling the drive shaft of said rotor to be sized only according to torque requirements.

9. The electrical drive of claim 8 wherein the housing is separable into at least first and second portions which include the first and second ends, respectively, and including a base member supporting said first portion of the housing, with said second portion being supported by said first portion.

10. The electrical drive of claim 9 wherein the rotor is removable, along with the second portion of the housing, with the stator being mounted within the second housing portion, permitting motors of different electrical ratings to be assembled with the first housing portion and sheave.

11. The electrical drive of claim 8 wherein the housing is separable into at least first and second portions, which include the first and second ends, respectively, with the first portion being a pedestal supported housing which supports the remaining portion of the housing.

12. The electrical drive of claim 8 wherein the sheave has a working surface which has an effective center line perpendicular to the rotational axis of the rotor drive shaft, with the sheave being located such that said effective center line bisects the first bearing means.

13. An electrical drive, comprising:
a base member,
a direct current drive motor including a housing having first and second ends, a stator disposed in said housing, and an armature within said stator including a drive shaft having first and second ends,
said housing being transversely separable into a first portion which includes the first end, and a second portion which includes the stator and second end,
means mounting the first portion of said housing on said base member,
the first portion of said housing having a right cylindrical, tubular portion adjacent to said first end having an inner surface which defines an opening, and an outer surface,
first bearing means mounted on the outer surface of said right cylindrical tubular portion,
second bearing means mounted in the second portion of the housing, adjacent to its second end,
a sheave mounted for rotation on said first bearing means,
the first end of said drive shaft extending outwardly through the opening of the first end of said housing,
and means coupling the first end of said drive shaft and said sheave,
the second end of said drive shaft being supported by said second bearing means,
such that a load on said sheave is supported by said first bearing means, the first portion of said housing, and said base member, enabling the drive shaft to be sized for drive torque, without regard to bending moments due to load on said sheave.

* * * * *